United States Patent [19]

Morimoto et al.

[11] Patent Number: 4,482,420
[45] Date of Patent: Nov. 13, 1984

[54] APPARATUS FOR PRODUCING COMPOSITE PIPES

[75] Inventors: Hisao Morimoto, Nagaokakyo; Toshimi Inai, Kyoto; Takashi Shimizu, Osaka, all of Japan

[73] Assignee: Sekisui Kagaku Kogyo Kabushiki Kaisha, Osaka, Japan

[21] Appl. No.: 532,053

[22] Filed: Sep. 14, 1983

Related U.S. Application Data

[60] Division of Ser. No. 349,665, Feb. 17, 1982, Pat. No. 4,412,882, which is a continuation-in-part of Ser. No. 175,043, Aug. 4, 1980, abandoned, which is a continuation of Ser. No. 3,943, Jan. 16, 1979, abandoned.

[30] Foreign Application Priority Data

Jan. 20, 1978 [JP] Japan .................................. 53-5557

[51] Int. Cl.³ .......................... B65C 9/04; B44C 7/00; B05C 3/02; B28B 17/00
[52] U.S. Cl. .................................. 156/392; 156/450; 156/500; 425/141; 118/414
[58] Field of Search ............... 156/188, 173, 446, 390, 156/392, 449, 429, 450, 582, 500, 575, 192, 195, 298, 244.13, 431, 432, 463, 468; 425/141, 115, 223, 447, 219; 264/166, 173, 310; 118/414, DIG. 11, 409; 134/144; 427/407.1, 428, 402

[56] References Cited

U.S. PATENT DOCUMENTS

| 1,141,320 | 6/1915 | Crump | 264/310 |
| 1,539,964 | 6/1925 | Siegwart | 264/310 |
| 2,228,636 | 1/1941 | Maguani | 264/310 |
| 3,316,587 | 5/1967 | Scruggs | 264/310 |
| 3,416,943 | 12/1968 | Clark et al. | 118/409 |
| 3,616,063 | 10/1971 | Bradley | 156/429 |
| 3,799,818 | 3/1974 | Bulters et al. | 156/446 |
| 3,849,174 | 11/1974 | Ancker | 427/365 |
| 4,005,677 | 2/1977 | Hart | 118/DIG. 11 |
| 4,065,533 | 12/1977 | Köppl et al. | 264/166 |
| 4,081,302 | 3/1978 | Drostholm et al. | 156/195 |
| 4,110,149 | 8/1978 | Poulsen | 156/429 |

FOREIGN PATENT DOCUMENTS 251946 1/1974 Japan .

Primary Examiner—Edward Kimlin
Assistant Examiner—L. Falasco
Attorney, Agent, or Firm—Wenderoth, Lind & Ponack

[57] ABSTRACT

An apparatus for producing a composite pipe having a desired wall thickness by using an endless steel belt as a mold which moves axially while rotating in the circumferential direction of a mandrel. In this apparatus, a thickness regulating device spaced a predetermined distance from the outside surface of the endless steel belt is used to adjust the wall thickness accurately to the desired value. Examples of the thickness regulating device are a cylinder roll, a taper roll, and a conveyor belt.

1 Claim, 13 Drawing Figures

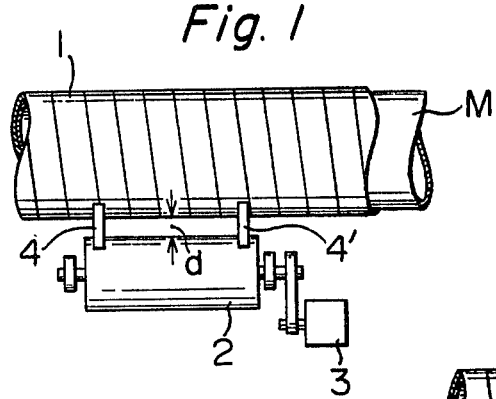
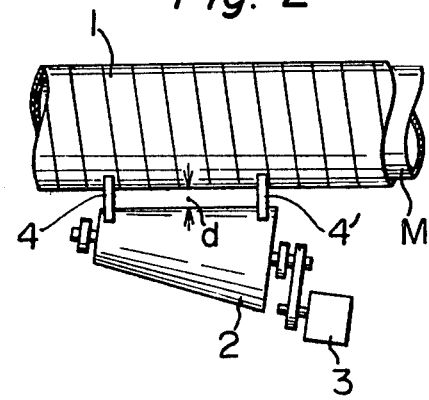
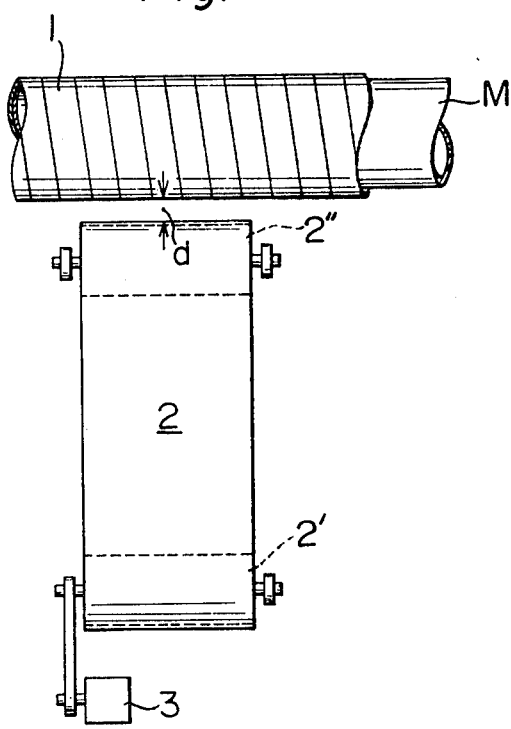

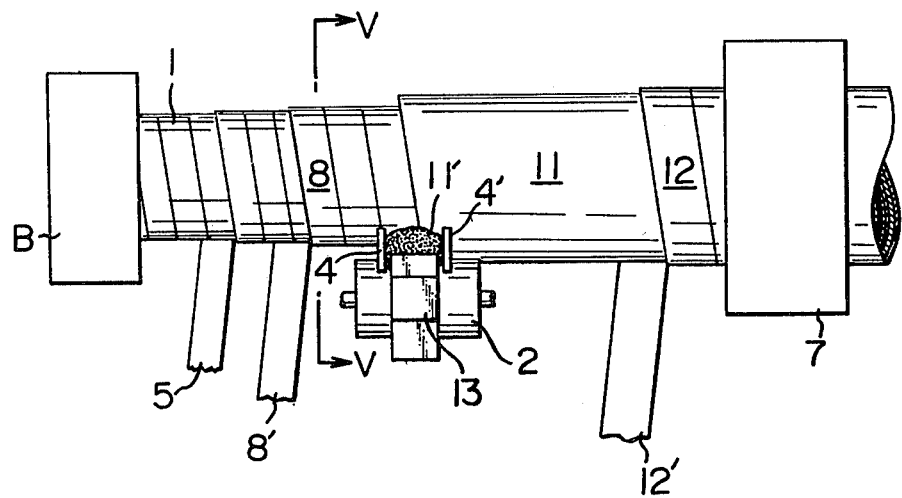
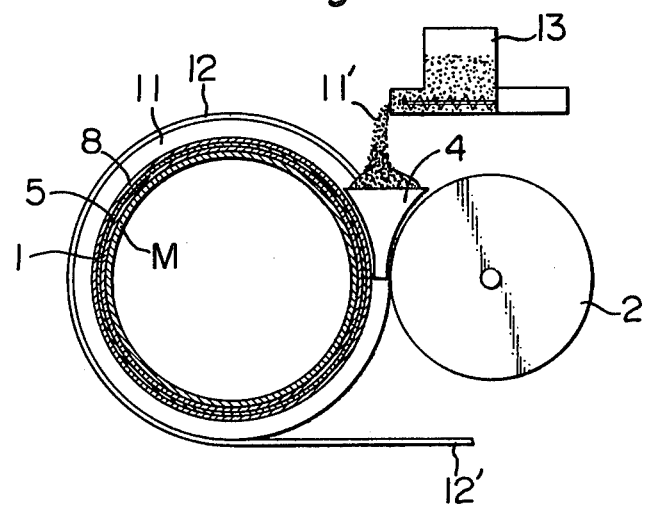

APPARATUS FOR PRODUCING COMPOSITE PIPES

This application is a division of application Ser. No. 349,665, filed Feb. 17, 1982, now Pat. No. 4,412,882 which in turn is a continuation-in-part of application Ser. No. 175,043, filed Aug. 4, 1980 now abandoned, which in turn was a continuation of application Ser. No. 003,943, filed Jan. 16, 1979 now abandoned.

This invention relates to an apparatus for producing a composite pipe which comprises means for placing a layer of a molding material having a specified thickness around a mold on a mandrel, and means for moving said mold axially while rotating it in the circumferential direction of the mandrel.

The method described in Japanese Patent Publication No. 1946/74 is a typical conventional technique for producing composite pipes. It comprises helically and densely wrapping an endless steel belt on a rotating mandrel, wrapping a cellophane tape on the endless steel belt to serve as a mold releasing agent, then spraying required amounts of reinforcing fibers and a solution of a thermosetting resin onto the cellophane tape, smoothing the surface of the resulting layer of molding material containing a binder by means of a spring roller, heat-curing the resulting layer while it is moved toward the free end of the mandrel and rotated together with the endless steel belt, and separating the endless steel belt from the resultant plastic pipe. Since in this method, the thickness of the layer of molding material containing a binder which is formed on the steel belt is adjusted by controlling the amounts of the reinforcing fibers and the thermosetting resin solution sprayed, it is difficult to produce a plastic pipe having the desired wall thickness.

It is an object of this invention to provide an apparatus which carries out a method which eliminates the aforesaid defect of the prior art.

The method to be carried out by the apparatus according to this invention comprises a step of feeding a molding material containing a binder between a mold and a thickness regulating device thereby to form around the mold a layer of the molding material having a specified thickness, said mold being placed on a mandrel and moving axially while rotating in the circumferential direction of the mandrel, and said thickness regulating device being spaced a predetermined distance from the periphery of said mold.

The apparatus of the invention also can carry out a method for producing a composite pipe which comprises wrapping a reinforcing material containing a binder around a mold to form an inside surface layer, said mold being placed on a mandrel and moving axially while rotating in the circumferential direction of the mandrel, wrapping a strip about the inside surface layer in a helical path at a specified pitch, feeding a molding material containing a binder into a groove formed by the wrapping of the strip on the inside surface layer and a thickness regulating device spaced a predetermined distance from the periphery of the mold thereby to form an intermediate layer having a specified thickness around the mold, wrapping a reinforcing material containing a binder about the intermediate layer, and hardening the resulting structure.

The apparatus for producing a composite pipe comprises a mandrel, a mold placed on said mandrel and capable of moving axially while rotating in the circumferential direction of the mandrel, and a thickness regulating device spaced a predetermined distance from the periphery of said mold.

Suitable binders that can be used in the method include thermosetting resins such as unsaturated polyester resins, epoxy resins and vinyl ester resins, and inorganic binders such as cement, calcium silicate and gypsum.

The molding material can be, for example, an inorganic material such as sand, calcium carbonate and clay, a hollow structure composed of an inorganic or organic material, or a short piece composed of glass fibers or artificial fibers.

The reinforcing material can be, for example, a tape-like piece composed of glass fibers, carbon fibers, artificial fibers or natural fibers.

The strip can be, for example, a cord-like piece composed of glass fibers, carbon fibers, artificial fibers or natural fibers, or a wire-like piece, a hollow structure or a tape-like piece composed of plastic or metal. Particularly preferred are cord-like pieces which can easily combine with the binder and having resistance to flattening, especially a twisted cord-like piece.

The invention is described more specifically below with reference to the accompanying drawings in which:

FIG. 1 is a top plan view of one embodiment of the apparatus according to this invention;

FIG. 2 is a top plan view of another embodiment of the apparatus according to this invention;

FIG. 3 is a top plan view of still another embodiment of the apparatus according to this invention;

FIG. 4 is a top plan showing a further apparatus according to this invention;

FIG. 5 is an enlarged sectional view taken along the line V—V of FIG. 4;

Figure 6:
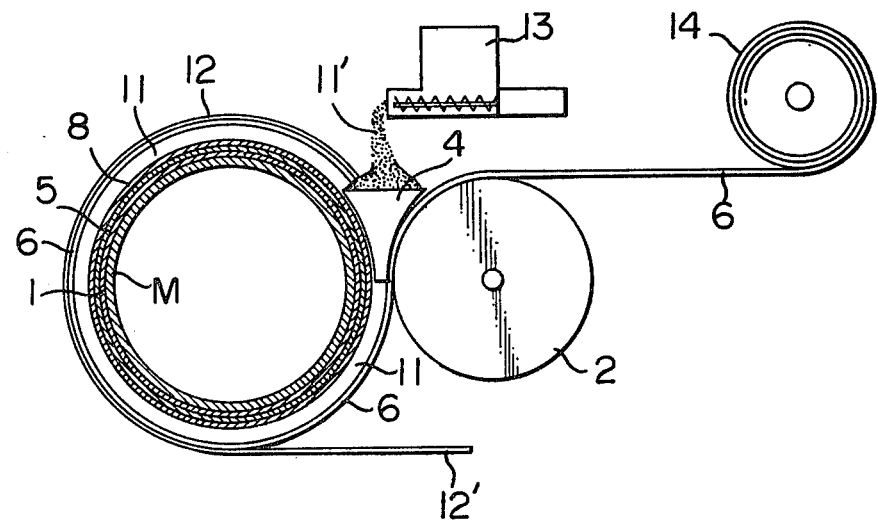
FIG. 6 is a sectional view showing another apparatus according to this invention.

Referring to FIG. 1, a mold 1 is made up of an endless steel belt wound densely about the periphery of a rotatable mandrel M, which is adapted to move axially while rotating in the circumferential direction of the mandrel. For example, while the mandrel M rotates through one turn, the belt 1 rotates through one turn in the circumferential direction and simultaneously moves in the axial direction (from left to right in the drawing) by an amount corresponding to the width of the belt. Such a mold is known, for example, from the Japanese Patent Publication cited hereinabove. The mold 1 may be an endless steel belt designed such that it moves axially while rotating in the circumferential direction of a fixed, non-rotatable mandrel. A thickness regulating device 2 is a cylinder-type roll having a smooth surface and made of a metal, plastic, etc., and is disposed parallel to the mold 1 with a predetermined distance d provided between its peripheral surface and the peripheral surface of the mold 1. The thickness regulating device 2 is rotated by a motor 3, and stops 4 and 4' are provided for preventing a molding material being molded between the mold 1 and the thickness regulating device 2 from falling from between the mold 1 and device 2. If desired, the motor 3 may be omitted.

The thickness regulating device 2 is not limited to the cylinder-type roll depicted in FIG. 1. It may, for example, be a tapered roll as shown in FIG. 2 which has a diameter gradually increasing in the moving direction of the mold 1. The reference letters and numerals in FIG. 2 designate the same members as in FIG. 1.

In still another embodiment, the thickness regulating device may be a conveyor belt stretched between a driving roll 2' rotated by motor 3 and a driven roll 2", as shown in FIG. 3. The top surface of the conveyor belt may be horizontal, or tilted. In this embodiment, the outside surface of the conveyor belt 2 of the roll 2" should be spaced a predetermined distance d from the outside surface of the endless steel belt 1.

The surface of the thickness regulating device 2 need not always be smooth, but may be formed in a pattern of waves or teeth at a specified pitch.

FIGS. 4 and 5 show another embodiment of the apparatus using a thickness regulating device of the type shown in FIG. 1. Referring to FIG. 4, a casing B is provided which includes a mechanism for moving the mold (endless steel belt) 1 over the periphery of the rotating mandrel while rotating it. The mechanism within the casing for actuating the mandrel and the endless steel belt is well known, and is described, for example, in the Japanese Patent Publication cited hereinabove.

In operation, a cellophane tape 5 which functions as a mold releasing agent is helically wrapped about the outside surface of the belt 1 which moves (from left to right in the drawing) over the periphery of the mandrel while rotating. A glass roving 8' impregnated with a thermosetting resin solution for forming an inside surface layer 8 of the composite pipe is helically wound over the cellophane tape 5. Next, a molding material 11' made by impregnating sand or aggregate particles containing sand with a thermosetting resin solution is fed from the supplier 13 into a space defined by the resulting inside surface layer 8, the thickness regulating roller 2 and stops 4 and 4'. It is fed in an amount sufficient to maintain a supply of molding material in the converging space upstream of the narrowest space between the mold surface layer 8 and the surface of the roller 2, which converging space has a dimension tangential to roller 2 which is equal to a substantial part of the radius of the roller 2. Thus, an intermediate layer 11 having a specified thickness is formed on the inside surface layer 8.

If desired, a roll 14 of a fibrous sheet-like reinforcing material 6, as shown in FIG. 6, may be fed by roller 2 into the aforesaid space together with the molding material 11'. Since in this embodiment, the resulting intermediate layer 11 is covered by the fibrous sheet-like reinforcing material 6 as shown in FIG. 6, the intermediate layer 11 is protected from peeling, dropping and deformation. In this case the roller 2 rotates following the wrapping movement of the reinforcing material 6 on the intermediate layer 11, and therefore, it is not necessary to provide a motor for rotating the roller 2.

Figure 7:
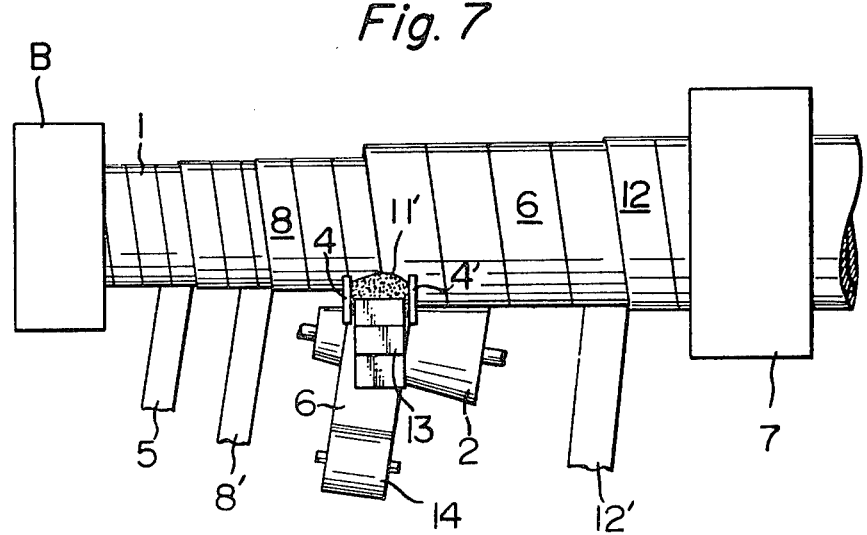
FIG. 7 is a top plan view of yet another apparatus according to this invention.

FIG. 7 shows one preferred embodiment of the present invention. The reference letter and numerals in FIG. 7 designate the same members as in FIG. 4. This embodiment is a modification of the apparatus shown in FIG. 4. A taper roll of the type shown in FIG. 2 is used as thickness regulating device 2 instead of the cylinder-type roll, and a fibrous sheet-like reinforcing material 6 of the type shown in FIG. 6 is used. In this case, the fibrous sheet-like reinforcing material 6 can be easily wrapped helically on the intermediate layer 11 without loosening.

Then, a glass roving 12' impregnated with a thermosetting resin solution is wrapped about the resulting intermediate layer 11 (in the embodiments shown in FIGS. 6 and 7, on the layer of fibrous sheet-like reinforcing material 6) to form an outside surface layer 12. The resin in the resulting structure is then cured in a curing furnace 7. The cured product is removed from the mold 1 in a customary manner to form a composite pipe having the desired thickness.

Figure 8:
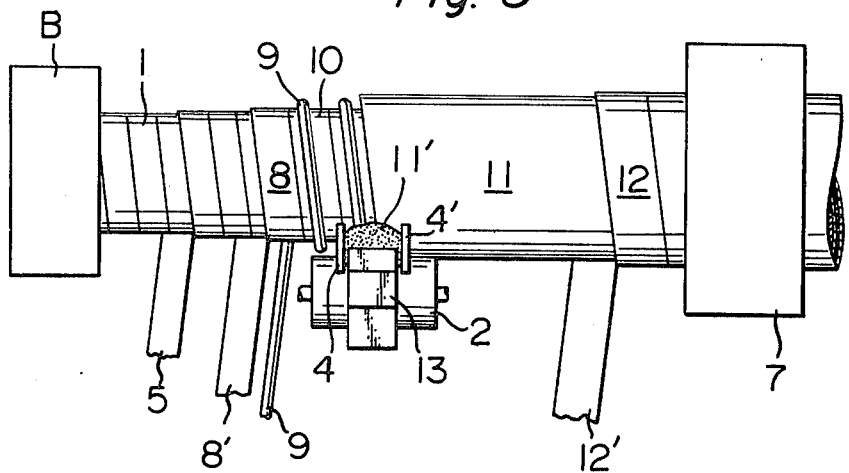
FIG. 8 is a top plan view of a further apparatus according to this invention.
Figure 9:
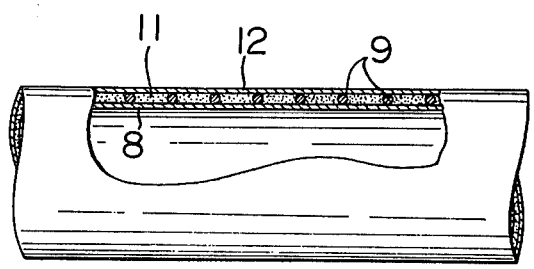
FIG. 9 is a cross-sectional plan view of a part of a composite pipe produced by the apparatus illustrated in FIG. 8.

FIG. 8 shows another embodiment of the invention which is directed to an apparatus for the production of a composite pipe having embedded therein a reinforcing strip. In this embodiment, a cellophane tape 5 is helically wound around the outside surface of belt 1 moving over the periphery of the mandrel while rotating, as in FIG. 4. A glass roving 8' impregnated with a thermosetting resin solution for forming an inside surface layer 8 of the composite pipe is wrapped on the cellophane tape 5. A cord (strip) 9 made by twisting several tens of glass fiber rovings impregnated with a thermosetting resin solution is wrapped helically at a specified pitch about the resulting inside surface layer 8. Thus, a continuous helical groove 10 is formed on the inside surface layer 8. A molding material 11' is then fed in the same way as in FIG. 4 into the space defined by the groove 10, the thickness regulating device 2 and stops 4 and 4' to form an intermediate layer 11 having a specified thickness. Glass roving 12' impregnated with a thermosetting resin solution is then wrapped about the intermediate layer 11 to form an outside surface layer 12. The resulting structure is treated in a curing furnace 7, and removed from the mold. This results in the production of a composite pipe having a specified thickness which includes intermediate layer 11 reinforced with ribs 9 between the outside surface layer 12 and the inside surface layer 8, as shown in FIG. 9.

In the embodiment of FIG. 8, the cylinder roll shown in FIG. 1 is used as a thickness regulating device 2. Of course, it may be replaced by the taper roll shown in FIG. 2 or the conveyor belt shown in FIG. 3. It is also possible to use the above-described fibrous sheet-like reinforcing material 6 together with these types of thickness regulating devices 2.

In the method carried out by the apparatus of the present invention, it is necessary to form first the layers of molding material and subsequently heat-cure them by a curing furnace, which inevitably requires use of a long mandrel (and mold). When forming a pipe at a high speed in particular, it is necessary to use a longer mandrel in order to provide the time necessary for the heat-curing. Since the mandrel is of a cantilever type, however, it easily moves depending on change in the operational conditions (e.g. change in the amount or composition of molding material to be supplied in the converging space), as the length of mandrel is greater and the diameter thereof is shorter. Under such conditions, the distance between the thickness regulating roller and the mold varies during operation and therefore it is difficult to mold a pipe of a fixed thickness despite use of the thickness regulating roller.

The most preferable embodiments of the present invention shown in FIGS. 10 to 13 make it possible to eliminate such difficulty.

Figure 10:
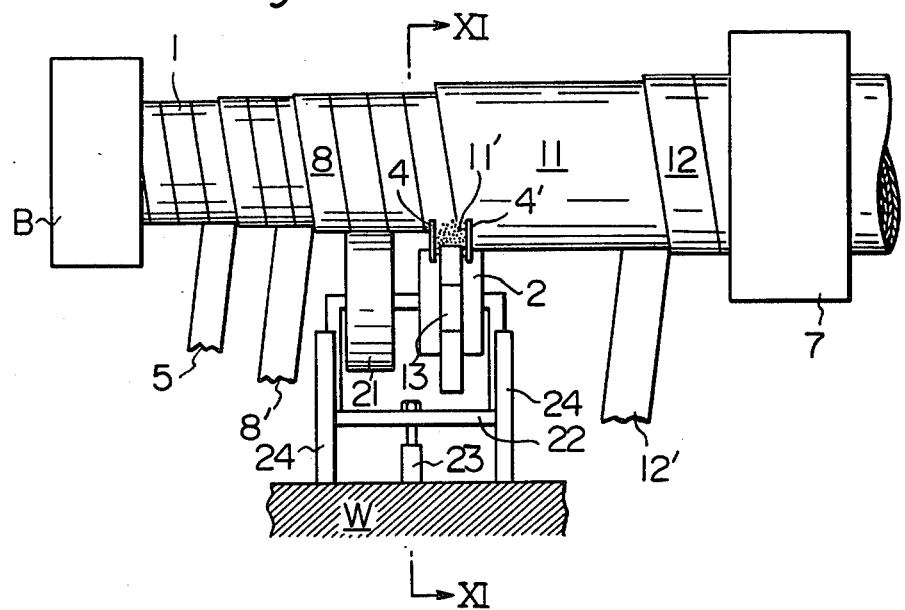
FIG. 10 is a top plan view of a preferred apparatus according to this invention.
Figure 11:
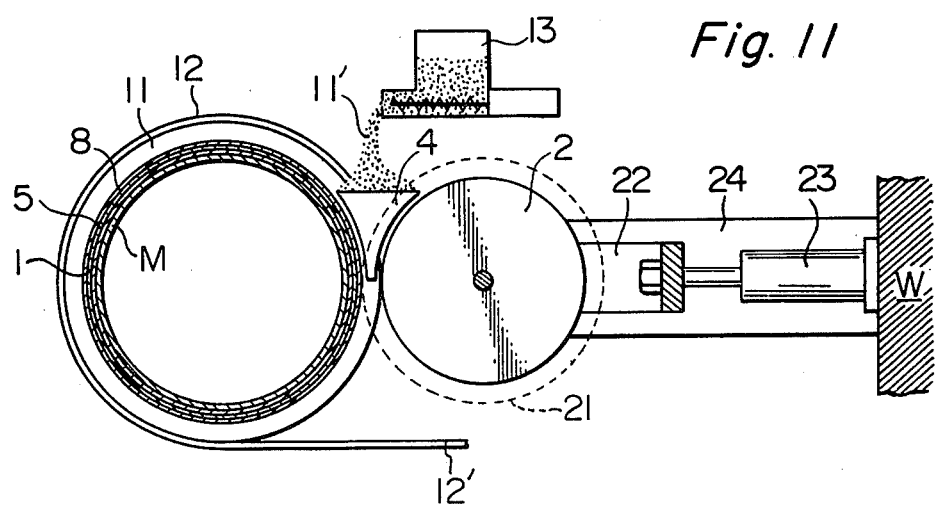
FIG. 11 is an enlarged sectional view taken along the line XI—XI of FIG. 10.

In the embodiments shown in FIGS. 10 and 11, as in the embodiments shown in the aforesaid FIGS. 4 and 5, a cellophane tape 5 which functions as a mold releasing agent is helically wrapped about the outside surface of the belt 1 which moves (from left to right in FIG. 10) over the periphery of the mandrel while rotating, the glass roving 8' impregnated with a thermosetting resin solution for forming an inside surface layer 8 of the composite pipe is helically wound over the cellophane tape 5, and then the molding material 11' impregnated with a thermosetting resin solution for forming the intermediate layer 11 is fed from the supplier 13 into a space defined by the resulting inside surface layer 8, the thickness regulating roller 2 and stops 4 and 4'. In this case, however, unlike the embodiments shown in FIGS. 4 and 5, there is used a contacting roller 21 which has a rotating shaft co-axial with the rotating shaft of the thickness regulating roller 2 and rotates while contacting the inside surface layer 8.

The thickness regulating roller 2 and the contacting roller 21 having the co-axial shaft are rotatably mounted on one frame 22 and the frame 22 is slidably fitted into two guides 24 secured to a fixed wall W. A press means 23 (such as a hydraulic cylinder, spring, etc.) is placed between the frame 22 and the wall W thereby to adjust appropriately the contact pressure of the contacting roller 21 with respect to the inside surface layer 8.

With such structure, it is possible to continuously form from the molding material 11' the intermediate layer 11 having a thickness corresponding to the difference between the radius of the thickness regulating roller 2 and the radius of the contacting roller 21 without the change of the thickness. Next, the outside surface layer 12 is formed on the intermediate layer by glass roving 12' impregnated with a thermosetting resin solution in the same way as aforesaid, and then cured in the curing furnace 7. The cured product is removed from the mold 1 in a customary manner to form a composite pipe having a fixed thickness of high precision.

The apparatus shown in FIGS. 10 and 11 make it possible to change optionally the thickness of the intermediate layer 11 by appropriately replacing one or both of the thickness regulating roller 2 and the contacting roller 21. The drawings show the embodiment in which the thickness regulating roller 2 and the contacting roller 21 rotate together. It is obvious, however, that the design can be changed in such a manner that they can rotate independently of each other.

Figure 12:
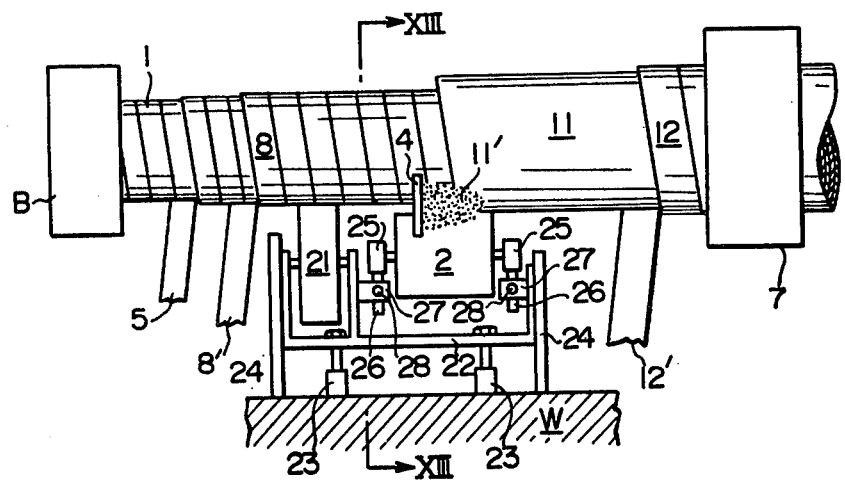
FIG. 12 is a top plan view of another preferred apparatus according this invention that is different from the embodiment of FIG. 10.
Figure 13:
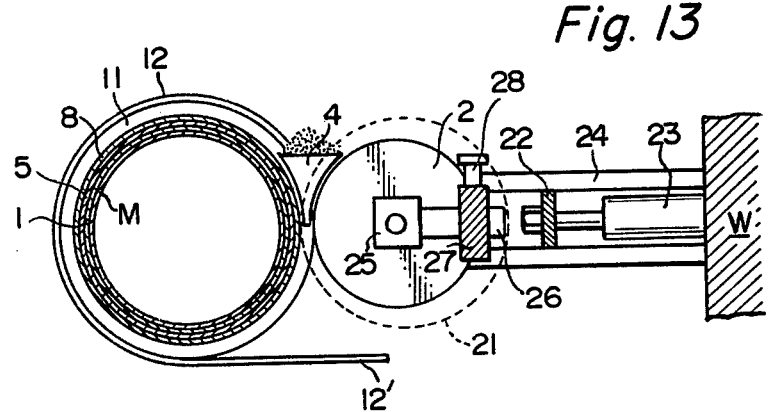
FIG. 13 is an enlarged sectional view taken along the line XIII—XIII of FIG. 12.

FIGS. 12 and 13 show the embodiment in which the thickness regulating roller 2 and the contacting roller 21 are provided on different, parallel rotating shafts. In this embodiment the shaft of the thickness regulating roller 2 is supported by bearings 25 different from those of the contacting roller 21. Said bearings 25 are fixed to linking rods 26 which are slidably inserted into supporting means 27 on the frame 22. The linking rods 26 are designed to be secured to the supporting means 27 in an appropriate position by fixing means 28 such as bolts. It is thus possible to change the position of the thickness regulating roller 2 relative to the contacting roller 21 according to a desired thickness of the intermediate layer 11. As in the embodiments of FIGS. 10 and 11, the contact pressure of the contacting roller 21 with respect to the inside surface layer 8 is adjusted by a press means 23 placed between the frame 22 slidably fitted into the guides 24 and the wall W.

In the operation of any of these embodiments, it is preferred to heat the thickness regulating device to a temperature not exceeding about 70° C. By so doing, the molding material 11' impregnated with a thermosetting resin solution, on contact with the thickness regulating device 2, will be moderately softened and easily deformed, and therefore, it is easy to form a smooth intermediate layer 11.

The apparatus of the invention makes it possible to produce composite pipes of good quality at high speeds by using a thickness regulating device of the simple structure described hereinabove. Since with the apparatus of this invention, a molding material is forced into a space of a specified dimension between the outside surface of a mold and the outside surface of the thickness regulating device, degassing is performed sufficiently, and a composite pipe of a predetermined thickness having an air-tight wall can be formed. Furthermore, the molding material can be fed by a simple method, for example by letting it fall into the aforesaid space from above, without the need for using a complex supply device which is adapted to operate synchronously with the rotation and movement of the mold. Hence, various types of molding materials can be used.

When a composite pipe is to be produced by using a strip as a reinforcing material, even a non-sticky molding material having a low binder content does not easily peel or drop off because it is forced into a comparatively narrow space (groove) enclosed by the outside surface of the thickness regulating device and the strip. This offers the advantage that inexpensive molding materials can be used without any trouble.

What we claim is:

1. An apparatus for use in producing a composite pipe, which comprises:
    a cylindrical mold rotatable around its cylindrical axis and movable axially while rotating for having a reinforcing material containing a binder wrapped around the mold spirally to form an inside surface layer thereon;
    a thickness regulating roller having an axis of rotation and positioned at a predetermined distance from the surface of said layer corresponding to a desired thickness of the pipe and defining a converging space with said mold;
    supporting means for supporting said thickness regulating roller;
    means for feeding a molding material containing a binder into said converging space; and
    a contacting roller having a rotating shaft coaxial or parallel with the axis of rotation of said thickness regulating roller and fixed to the supporting means and having the periphery of said contacting roller contacting said inside surface layer for maintaining said thickness regulating roller at said position.

* * * * *